United States Patent
Gruhler et al.

(10) Patent No.: US 11,758,839 B2
(45) Date of Patent: Sep. 19, 2023

(54) METHOD FOR TEACHING AT LEAST ONE SECTION OF A DELIMITING BORDER OF A LAND AREA FOR A GREEN AREA MAINTENANCE SYSTEM, METHOD FOR OPERATING A GREEN AREA MAINTENANCE SYSTEM, TEACH-IN SYSTEM AND GREEN AREA MAINTENANCE SYSTEM

(71) Applicant: Andreas Stihl AG & Co. KG, Waiblingen (DE)

(72) Inventors: Matthias Gruhler, Waiblingen (DE); Goetz Wintergerst, Stuttgart (DE); Stephan Meyer, Waiblingen (DE); Petrus Van Zutven, Innsbruck (AT); Sebastian Kraemer, Innsbruck (AT); Samuel Zoettl, Kufstein (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 308 days.

(21) Appl. No.: 17/084,758

(22) Filed: Oct. 30, 2020

(65) Prior Publication Data
US 2021/0127569 A1 May 6, 2021

(30) Foreign Application Priority Data
Oct. 31, 2019 (EP) .................................. 19206458

(51) Int. Cl.
*A01D 34/00* (2006.01)
*G05D 1/02* (2020.01)
*A01D 101/00* (2006.01)

(52) U.S. Cl.
CPC ......... *A01D 34/008* (2013.01); *G05D 1/0221* (2013.01); *A01D 2101/00* (2013.01)

(58) Field of Classification Search
CPC . A01D 34/008; A01D 2101/00; G05D 1/0221
(Continued)

(56) References Cited

U.S. PATENT DOCUMENTS 10,444,760 B2    10/2019  Grufman et al.
2013/0204481 A1*  8/2013  Kouno .................. G05D 1/024
                                                        701/25

(Continued)

FOREIGN PATENT DOCUMENTS

CN        102662400 A     9/2012
CN        102771246 A    11/2012
(Continued)

OTHER PUBLICATIONS

Chinese-language Office Action issued in Chinese Application No. 202011188477.9 dated May 19, 2023 (13 pages).

*Primary Examiner* — Mahmoud Gimie
(74) *Attorney, Agent, or Firm* — Crowell & Moring LLP

(57) ABSTRACT

A method teaches at least one section of a delimiting border of a land area for a green area maintenance system. The green area maintenance system has: an autonomous mobile green area maintenance robot, and a robot position determining system. The robot position determining system is designed to detect robot position coordinates of the green area maintenance robot. The robot position coordinates are based on a first position determining technology. The method (a) defines a sequence of teach-in position coordinates of the section, the teach-in position coordinates being based on a second position determining technology different from the first position determining technology, and (b) transforms the defined sequence of teach-in position coordinates into a sequence of transformation robot position coordinates, the transformation robot position coordinates being based on the first position determining technology.

15 Claims, 7 Drawing Sheets

(58) Field of Classification Search
USPC .......................................................... 701/25
See application file for complete search history.

(56) References Cited

U.S. PATENT DOCUMENTS

| | | | |
|---|---|---|---|
| 2014/0012453 A1 | 1/2014 | Johnson et al. | |
| 2015/0163993 A1 | 6/2015 | Pettersson | |
| 2016/0165795 A1 | 6/2016 | Balutis et al. | |
| 2018/0004217 A1 | 1/2018 | Biber et al. | |
| 2020/0019156 A1 | 1/2020 | Drew et al. | |

FOREIGN PATENT DOCUMENTS

| | | | |
|---|---|---|---|
| CN | 103543746 A | 1/2014 | |
| CN | 203691948 U | 7/2014 | |
| CN | 106662452 A | 5/2017 | |
| CN | 107003675 A | 8/2017 | |
| EP | 2884364 A1 * | 6/2015 | ........... A01D 34/008 |
| EP | 2 946 650 B1 | 8/2017 | |
| EP | 3 820 343 A1 | 5/2021 | |
| WO | WO 2016/097900 A1 | 6/2016 | |
| WO | WO 2019/185930 A1 | 10/2019 | |

* cited by examiner

METHOD FOR TEACHING AT LEAST ONE SECTION OF A DELIMITING BORDER OF A LAND AREA FOR A GREEN AREA MAINTENANCE SYSTEM, METHOD FOR OPERATING A GREEN AREA MAINTENANCE SYSTEM, TEACH-IN SYSTEM AND GREEN AREA MAINTENANCE SYSTEM

CROSS REFERENCE TO RELATED APPLICATION

This application claims priority under 35 U.S.C. § 119 from European Patent Application No. 19206458.2, filed Oct. 31, 2019, the entire disclosure of which is herein expressly incorporated by reference.

BACKGROUND AND SUMMARY OF THE INVENTION

The invention relates to a method for teaching at least one section of a delimiting border of a land area for a green area maintenance system, a method for operating a green area maintenance system having such a teach-in method, a teach-in system for teaching at least one section of a delimiting border of a land area for a green area maintenance system, and a green area maintenance system having such a teach-in system.

The object of the invention is the provision of a method and a teach-in system for teaching at least one section of a delimiting border of a land area for a green area maintenance system, each of which has improved properties. Furthermore, the object of the invention is the provision of a method for operating a green area maintenance system having such a teach-in method, and a green area maintenance system having such a teach-in system.

The invention achieves this object by providing methods, a teach-in system, and a green area maintenance system, in accordance with the claim invention.

The method according to the invention is designed or configured for teaching, in particular automatically, at least one section of a delimiting border of a land area which in particular is to be maintained, for an, in particular electrical, green area maintenance system. The green area maintenance system features an autonomous, mobile green area maintenance robot and an, in particular electric, robot position determining system. The robot position determining system is designed to detect robot position coordinates of the green area maintenance robot. The robot position coordinates are based on a first position determining technology. The method comprises the steps of: a) defining or specifying a sequence of teach-in position coordinates of the section, in particular by a user. The teach-in position coordinates are based on a second position determining technology which is different from or not identical, in particular dissimilar to, the first position determining technology. b) transforming, in particular automatically transforming, or converting the defined sequence of teach-in position coordinates into a sequence of transformation robot position coordinates. The transformation robot position coordinates are based on the first position determining technology.

The method, in particular the transformation, provides the facility that the teach-in position coordinates do not need to or may not be based on the same position determining technology as the robot position coordinates. This means that the method allows more degrees of freedom for the teach-in process. In addition or alternatively, the method allows the first position determining technology to be chosen optimally for detecting the robot position coordinates and the second position determining technology to be chosen optimally for defining the teach-in position coordinates, in particular independently of each other.

In particular, the area can be an open space, in particular an unpaved area of land, or a green space such as a field with grassed areas. Additionally or alternatively, the delimiting border can be defined by one end of the land area, in particular a paved piece of land such as a path and/or a terrace and/or a driveway, exit and/or entrance and/or a parking space, and/or a stone floor, a wall, a fence, a hedge, a flower bed and/or otherwise.

The first position determining technology and/or the second position determining technology can be defined, in particular in each case, by their design and/or operating method and/or principle. In particular, the first position determining technology and the second position determining technology can be different or not identical, in particular dissimilar, in terms of structure and/or operating method and/or principle. In addition or alternatively, different position determining systems need to or can be based, in particular in each case, on the first position determining technology and/or the second position determining technology. In particular, the robot position determining system can be based on the first position determining technology. In other words, different position determining systems do not need to or may not be based on different position determining technologies, but can be similar, in particular identical, in structure and/or operating method and/or principle and thus based on the same position determining technology. In other words, the position determining technology, in particular the first and/or second, and a position determining system, in particular the robot position determining system, can be different.

The robot position coordinates and/or the teach-in position coordinates can be, in particular in each case, planar or two-dimensional or cubic or three-dimensional position coordinates.

The transformation can comprise calculating from teach-in position coordinates, in particular of a respective point, in a teach-in coordinate system, in particular in a teach-in reference system, the transformation robot position coordinates thereof which are in a different transformation robot coordinate system, in particular a different transformation robot reference system. In addition or alternatively, the transformation can be a linear transformation.

Step b) can be executed after step a).

In an extension of the invention, either the first position determining technology or the second position determining technology is, in particular global, satellite-based position determining, local position determining, radio position determining, inertial position determining, odometry position determining, ultrasonic position determining, sonographic position determining, sonar position determining, radar position determining, radargrammetric position determining, tachymetric position determining or total-station position determining, lidar position determining, laser-scanning position determining, camera position determining, image position determining, and/or photogrammetric position determining.

In particular, the satellite position determining can be based on receiving signals, in particular radio signals, from navigation satellites and pseudolites. In addition or alternatively, NAVSTAR GPS, GLONASS, Galileo and/or Beidou are based on satellite position determining and thus on the same position determining technology. As another addition or alternative, the first position determining technology or the second position determining technology can be differential satellite position determining.

The local position determining may be based on an interaction, in particular an exchange of signals, with at least one local, in particular artificial, position determining station, in particular reception of signals from the at least one local position determining station. In particular, the at least one local position determining station may be installed at, in particular on, the delimiting border and/or on the land area, in particular only being suitable for and/or for the purpose of determining the position. In particular, at the delimiting border can mean a maximum of 10 meters (m), in particular a maximum of 5 m, in particular a maximum of 2 m, in particular a maximum of 1 m, away from the delimiting border outside of the land area. In addition or alternatively, the local position determining system may be based on distance and/or direction measurements with respect to at least one local position determining station, in particular trilateration and/or triangulation, radio signals, radio waves, radar, ultra-wideband, Bluetooth, WLAN, magnetic fields, acoustic signals, sound, ultrasound, optical signals, light and/or laser light. In particular, the at least one local position determining station, in particular in each case, can be referred to as a radio beacon and/or local position determining transmitter.

Radio position determining can comprise a method for tracking objects, in particular the at least one local position determining station, by means of radio signals.

Inertial position determining can be based on the measurement of accelerations and/or rotation rates and integrating the measured accelerations and/or the measured rotation rates.

Odometric position determining can be based on data from a propulsion system and/or a, in particular a respective, number of wheel revolutions of at least one wheel, in particular of the propulsion system.

Ultrasonic position determining can comprise a method for tracking objects, in particular the at least one local position determining station, by means of ultrasound.

Sonographic position determining can be based on ultrasound and/or comprise an imaging and/or image-analysis method of objects, in particular not of a local position determining station, at the section and/or on the land area.

Sonar position determining can comprise a method for tracking objects, in particular the at least one local position determining station, by means of sound, in particular sound pulses.

Radar position determining can comprise a method for tracking objects, in particular the at least one local position determining station, by means of radar.

Radargrammetric position determining can be based on radar and/or comprise an imaging and/or image-analysis method of objects, in particular not of a local position determining station, at the section and/or on the land area.

Tachymetric position determining can be based on optical signals and/or measurement of horizontal directions, vertical angles and/or inclined paths, in particular to the at least one local position determining station.

Lidar position determining can comprise a method for tracking objects, in particular the at least one local position determining station, by means of light, in particular laser light.

Laser-scanning position determining can be based on laser light and/or comprise an imaging and/or image-analysis method of objects, in particular not a local position determining station, at the section and/or on the land area.

Camera position determining can be based on recording images from different positions and/or with depth information and may comprise an image-analysis method of the section and/or the land area, in particular of objects, in particular not of a local position determining station, at the section and/or on the land area.

Image position determining can comprise an imaging and/or image-analysis method of the section and/or the land area, in particular of objects, in particular not of a local position determining station, at the section and/or on the land area. In particular, image position determining can be based on ultrasound, radar and/or light, particularly laser light.

Photogrammetric position determining can be based on light, in particular laser light, and/or comprise an imaging and/or image-analysis method of the section and/or the land area, in particular of objects, in particular not of a local position determining station, at the section and/or on the land area.

In an extension of the invention, step a) comprises: detecting, in particular automatically detecting, or determining or calculating the sequence of teach-in position coordinates using an, in particular electrical, teach-in position determining system, in particular at least a part of the teach-in position determining system, in particular the entire teach-in position determining system, at, in particular on, the section and/or on the land area. This allows a simple and thus user-friendly and/or accurate definition of the sequence of the teach-in position coordinates. In particular, the detection can be carried out via an interaction between the teach-in position determining system and the delimiting border. In addition or alternatively, the teach-in position determining system can be different from the robot position determining system. In addition or alternatively, the teach-in position determining system can have, in particular be, a teach-in position determining device. As another addition or alternative, the at least one part, in particular the entire teach-in position determining system, can be a receiver, a transmitter and/or a reflector and/or be portable. In particular, portable can mean hand-held, particularly hand-carried. Hand-held, in particular hand-carried, can mean that the part can have a maximum mass of 50 kilograms (kg), in particular of 20 kg, in particular of 10 kg. As another addition or alternative, at the delimiting border can mean a maximum of 10 m, in particular a maximum of 5 m, in particular a maximum of 2 m, in particular a maximum of 1 m, away from the delimiting border outside of the land area.

In an embodiment of the invention, step a) comprises: guiding the at least one part of the teach-in position determining system, in particular the entire teach-in position determining system, along at least the section, in particular by a user, and detection of, in particular the, teach-in position coordinates, in particular of a teach-in position of the at least one part, in particular of the entire teach-in position determining system, during the guidance. This allows a particularly simple and thus particularly user-friendly and/or particularly accurate definition of the sequence of teach-in position coordinates.

In an extension of the invention, step b) comprises displacement, turning, and/or scaling. In particular, displacement can be referred to as translation. In addition or alternatively, turning can be referred to as rotation. As another addition or alternative, scaling can be referred to as a change of scale.

In an extension of the invention, the method comprises the step of: identification, in particular automatic identification and/or by the user, of, in particular a pair of, reference-point teach-in position coordinates with respect to, in particular, the sequence of teach-in position coordinates. In addition, the method comprises the step of: identification, in particular automatic identification and/or by the user, of, in particular a pair of, reference transformation robot position coordinates with respect to the sequence of transformation robot position coordinates. Step b) comprises: transforming subject to the condition that the identified reference-point teach-in position coordinates and the identified reference-point transformation robot position coordinates identify the same reference point. This facilitates the translation, where available and/or required.

In one embodiment of the invention, the method comprises the step of: identification, in particular automatic identification and/or by the user, of, in particular, an additional pair of additional reference-point teach-in position coordinates with respect, in particular, to the sequence of teach-in position coordinates. In addition, the method comprises the step of: identification, in particular automatic identification and/or by the user, of, in particular an additional pair of, additional reference-point transformation robot position coordinates with respect to the sequence of transformation robot position coordinates. Step b) comprises: transforming subject to the condition that the identified additional reference-point teach-in position coordinates and the identified additional reference-point transformation robot position coordinates identify the same additional reference point.

In addition or alternatively, the method comprises the step of: identification, in particular automatic identification and/or by the user, of a teach-in orientation at the, in particular identified, reference-point teach-in position coordinates with respect to the sequence of teach-in position coordinates. In addition, the method comprises the step of: identification, in particular automatic identification and/or by the user, of a transformation robot orientation at the, in particular identified, reference-point transformation robot position coordinates with respect to the sequence of transformation robot position coordinates. Step b) comprises: transforming subject to the condition that the identified teach-in orientation and the identified transformation robot orientation identify the same reference orientation at the reference point.

This, in particular the additional reference point, allows the rotation and/or scaling where available and/or required. In addition or alternatively this, in particular the reference orientation, enables a rotation where available and/or required. In particular, the additional reference point need not or may not be required, particularly under the assumption that scaling need not or may not be necessary. In addition or alternatively, orientation at the position coordinates with respect to and/or for the sequence of position coordinates can mean parallel or orthogonal to the sequence of position coordinates at the position coordinates, in particular, in a plane defined by the sequence of position coordinates and/or into or out of a closed curve defined by the sequence of position coordinates.

In one embodiment of the invention, the in particular additional reference point is characterized by a docking station position of an, in particular electric, docking station for the green area maintenance robot and/or by a robot position of the green area maintenance robot, which is in particular different from the docking station position, in particular at, in particular on, the section. In particular, the reference orientation is characterized by a docking station orientation of the docking station and/or by a robot orientation of the green area maintenance robot, in particular at the section. This enables a simple identification. In particular, the docking station can be a charging station, in particular an electrical one, for charging the green area maintenance robot, in particular electrically, with drive energy. In addition or alternatively, the docking station orientation can be defined by a longitudinal axis and/or a central axis and/or a docking axis of the docking station. As another addition or alternative, the robot orientation can be defined by a longitudinal axis and/or a central axis and/or a docking axis of the green area maintenance robot. As another addition or alternative, the docking station with the docking station orientation at the section can be positioned parallel or orthogonal to the latter. As another addition or alternative, the green area maintenance robot with the robot orientation at the section can be positioned parallel or orthogonal to the latter. As another addition or alternative, the robot positions for the reference point and for the additional reference point can be reached by moving the green area maintenance robot, in particular controlled by the user.

The method according to the invention is designed or configured to operate a, in particular the, green area maintenance system, in particular automatically. The green area maintenance system features a, in particular the, autonomous mobile green area maintenance robot, a, in particular the, robot position determining system and an, in particular electrical, comparison and control system. The robot position determining system is designed or configured to detect or determine or calculate, in particular automatically, robot position coordinates, in particular of the robot position, of the green area maintenance robot, in particular on the land area. The robot position coordinates are based on a first, in particular the first, position determining technology. The comparison and control system is designed or configured to compare, in particular automatically, the detected robot position coordinates with a sequence, in particular the, sequence of transformation robot position coordinates and to control, in particular automatically, a movement of the green area maintenance robot, in particular on the land area, depending on a result of the comparison. The transformation robot position coordinates are based on the first position determining technology. The method comprises a method as described above for teaching-in, in particular the, at least one section of a, in particular the, delimiting border of a, in particular the, land area. The method also comprises the steps of: Detecting, in particular automatically detecting, determining or calculating robot position coordinates, in particular of the robot position, of the green area maintenance robot, in particular on the land area, using the robot position determining system. Comparing, in particular automatically comparing, the detected robot position coordinates with the sequence of transformation robot position coordinates using the comparison and control system. Controlling, in particular automatically controlling, the movement of the green area maintenance robot, particularly on the land area, depending on the result of the comparison by means of the comparison and control system, in particular in such a way that the green area maintenance robot remains on the land area, in particular within the delimiting border.

This enables the land area to be maintained autonomously using the green area maintenance robot.

In particular, 'autonomously maintained' can mean that the green area maintenance robot can move and/or act on the land area independently, automatically, in a self-determined, self-controlled manner and/or independently of a user and/or can select at least one parameter, in particular a route parameter, and/or a reversal point. In addition or alternatively, autonomous maintenance can mean that the green area maintenance robot can begin and/or end a maintenance process independently. As another addition or alternative, during the autonomous maintenance the green area maintenance robot does not need to be or may not be controlled by the user, in particular not remotely controlled. In other words, during the autonomous maintenance the green area maintenance robot can work in particular without human control and/or guidance. As another addition or alternative, the green area maintenance robot can be referred to as a service robot and/or service-providing robot.

The green area maintenance robot can be designed to maintain the land area. In particular, the green area maintenance robot can comprise a maintenance tool.

The detection can be carried out via an interaction between the robot position determining system and the delimiting border.

The robot position determining system can comprise, in particular be, a robot position determining device.

The robot position determining system can comprise, in particular be, a receiver.

In an extension of the invention, the green area maintenance robot comprises the robot position determining system, in particular at least partially or completely.

In an extension of the invention, the green area maintenance robot is designed or configured as a lawnmower robot, in particular with a lawn-mowing tool. In particular, the green area maintenance robot can be designed as a mulching mower robot. In addition or alternatively, the lawn-mowing tool may comprise at least one mowing line, at least one plastic knife, at least one metal knife and/or a metal cutting blade with at least one cutting edge and/or with at least one cutting tooth. As another addition or alternative, the lawn-mowing tool can be designed as a rotating lawn-mowing tool for mowing the product to be mown in the so-called free cutting process without a stationary blade, in particular by using the centrifugal force of the lawn-mowing tool to produce a cutting operation.

The teach-in system according to the invention is designed or configured for teaching, in particular automatically, in particular the at least one section of a, in particular the, delimiting border of a, in particular the, land area for a, in particular the, green area maintenance system, in particular for carrying out a method as described above for teaching, in particular the, at least one section of a, in particular the, delimiting border of a, in particular the, land area. The green area maintenance system features an, in particular the, autonomous mobile green area maintenance robot and a, in particular the, robot position determining system. The robot position determining system is designed to detect robot position coordinates of the green area maintenance robot. The robot position coordinates are based on a first, in particular the first, position determining technology. The teach-in system comprises a definition device, which is in particular electrical and/or user-operable, and a transformation device, which is in particular electric, in particular electronic. The definition device is designed or configured, in particular by the user, to define a sequence, in particular the sequence, of teach-in position coordinates of the section, in particular automatically. The teach-in-position coordinates are based on a second, in particular the second, position determining technology, which is different from the first position determining technology. The transformation device is designed or configured for transforming, in particular automatically, the defined sequence of teach-in position coordinates into a sequence, in particular the sequence, of transformation robot position coordinates. The transformation robot position coordinates are based on the first position determining technology.

The teach-in system can provide the same advantages as previously described for the teach-in method.

In particular, the green area maintenance system, the green area maintenance robot, the robot position determining system, the first position determining technology and/or the second position determining technology can be designed partly or completely as described previously for the method for teaching-in and/or operating.

The teach-in system can comprise a portable, in particular electrical and/or user-operable, teach-in device. The teach-in device may comprise the definition device and/or the transformation device, in particular partly or completely. In particular, portable can mean hand-held, particularly hand-carried. Hand-held, in particular hand-carried, device can mean that the teach-in device can have a maximum mass of 50 kg, in particular of 20 kg, in particular of 10 kg. In addition or alternatively, the portable teach-in device can be a smartphone and/or a tablet. As another addition or alternative, the definition device and the transformation device can be separate or isolated from each other. As another addition or alternative, the transformation device can be a computer, particularly a cloud server.

In an extension of the invention, the definition device comprises a, in particular the, teach-in position determining system. The teach-in position determining system is designed or configured to detect, in particular automatically, the sequence of teach-in position coordinates. In particular, the teach-in position determining system may be designed partially or completely as described previously for the teach-in method. In addition or alternatively, the teach-in device, if present, may comprise at least the part of the teach-in position determining system, in particular the complete teach-in position determining system.

In an extension of the invention, the teach-in system has an identification device, which is in particular electrical and/or user-operable. The identification device is designed and/or configured to identify, in particular identify automatically and/or by the user, reference-point teach-in position coordinates with respect to the, in particular the sequence of, in particular the, teach-in position coordinates and to identify, in particular to identify automatically and/or by the user, of, in particular, the reference-point transformation robot position coordinates with respect to the sequence of transformation robot position coordinates. The transformation device is designed and/or configured to transform subject to the condition that the identified reference-point teach-in position coordinates and the identified reference-point transformation robot position coordinates identify a common, in particular the same, reference point. In particular, the teach-in device may, if present, comprise the identification device, at least partially or completely. In addition or alternatively, the teach-in system, in particular the identification device, can have an input device, in particular a touch screen, a keyboard and/or a mouse, for the identification.

The green area maintenance system according to the invention comprises a teach-in system as described previously, a, in particular the, autonomous mobile green area maintenance robot, a, in particular the, robot position determining system, and a, in particular the, comparison and control system. The robot position determining system is designed and/or configured to detect, in particular automatically, robot position coordinates of the green area maintenance robot. The robot position coordinates are based on a first, in particular the first, position determining technology. The comparison and control system is designed or configured to compare, in particular automatically, the detected robot position coordinates with a sequence, in particular the sequence, of transformation robot position coordinates and to control, in particular automatically, a, in particular the, motion of the green area maintenance robot, in accordance with a, in particular the, result of the comparison. The transformation robot position coordinates are based on the first position determining technology.

The green area maintenance system can provide the same benefits as previously described for the method of operation.

In particular, the green area maintenance system, the green area maintenance robot, the robot position determining system and/or the comparison and control system can be designed partly or completely as described previously for the teach-in and/or the operating method.

The green area maintenance robot can comprise the comparison and control system, in particular at least partially or completely.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
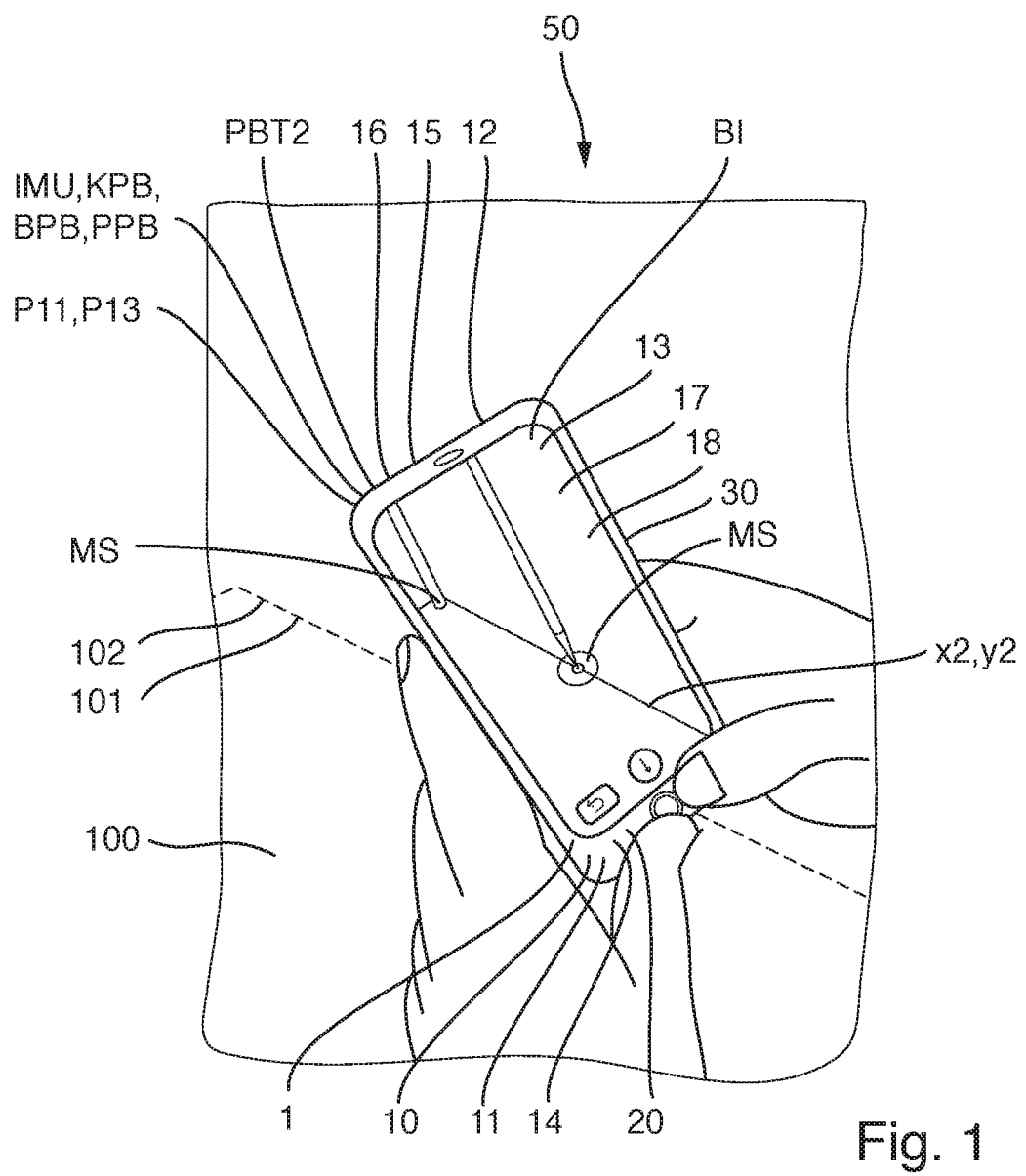
FIG. 1 shows a schematic view of a method and a teach-in system according to an embodiment of the invention for teaching at least one section of a delimiting border of a land area for a green area maintenance system according to the invention comprising a definition, in particular a detection of a sequence of teach-in position coordinates.
Figure 2:
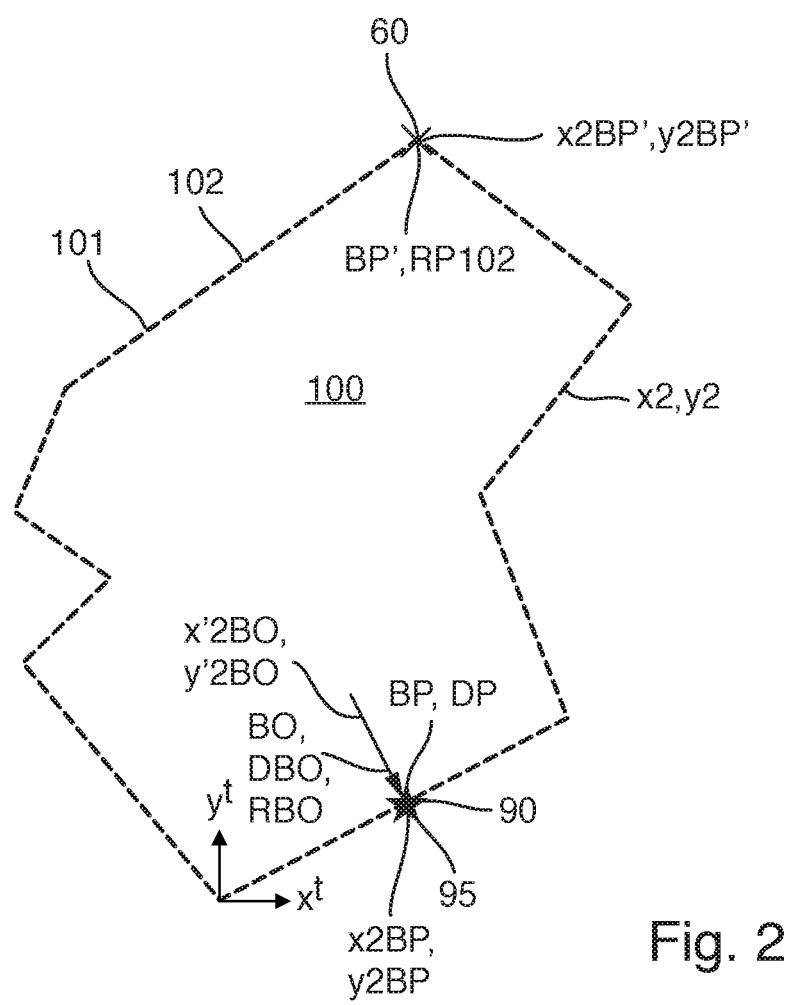
FIG. 2 shows a schematic view of the defined sequence of teach-in-position coordinates of FIG. 1.

FIGS. 1 to 7 show a method for operating a green area maintenance system 50.

The green area maintenance system 50 has an autonomous mobile green area maintenance robot 60 and a robot position determining system 70, in particular and a comparison and control system 80. The robot position determining system 70 is designed to detect robot position coordinates x1, y1 of the green area maintenance robot 60, in particular in a transformation robot coordinate system xr, yr. The robot position coordinates x1, y1 are based on a first position determining technology PBT1. The comparison and control system 80 is designed to compare the detected robot position coordinates x1, y1 with a sequence of transformation robot position coordinates x3, y3 and to control a movement of the green area maintenance robot 60 depending on a result of the comparison. The transformation robot position coordinates x3, y3 are based on the first position determining technology PBT1.

The operating method comprises a method for teaching at least one section 102 of a delimiting border 101, in the illustrated exemplary embodiments of the entire delimiting border 101, of a land area 100, in particular to be maintained, for the green area maintenance system 50. The method comprises the steps: a) defining a sequence of teach-position coordinates x2, y2 of the section 102, in particular of the entire delimiting border 101, in particular in a teach-in coordinate system xt, yt. The teach-in position coordinates x2, y2 are based on a second position determining technology PBT2, which is different from the first position determining technology PBT1. b) Transforming the defined sequence of teach-in position coordinates x2, y2 into the sequence of transformation robot position coordinates x3, y3, in particular in the transformation robot coordinate system xr, yr. The transformation robot position coordinates x3, y3 are based on the first position determining technology PBT1.

In addition, the green area maintenance system 50 comprises a teach-in system 1. The teach-in system 1 is designed to teach the at least one section 102 of the delimiting border 101 of the land area 100 for the green area maintenance system. The teach-in system 1 has a definition device 10, which in particular can be user-operated, and a transformation device 20. The definition device 10 is designed to define the sequence of teach-in position coordinates x2, y2 of the section 102. The teach-in-position coordinates x2, y2 are based on the second position determining technology PBT2, which is different from the first position determining technology PBT1. The transformation device 20 is designed to transform the defined sequence of teach-in-position coordinates x2, y2 into a sequence of transformation robot position coordinates x3, y3. The transformation robot position coordinates x3, y3 are based on the first position determining technology PBT1.

In addition, the operating method has the steps: Detecting the robot position coordinates x1, y1 of the green area maintenance robot 60 using the robot position determining system 70. Comparing the detected robot position coordinates x1, y1 with the sequence of transformation robot position coordinates x3, y3 using the comparison and control system 80. Controlling the movement of the green area maintenance robot 60 depending on the result of the comparison by means of the comparison and control system 80, in particular in such a way that the green area maintenance robot 60 remains on the land area 100, in particular within the delimiting border 101.

In particular, the robot position determining system 70 and the comparison and control system 80 are designed to interact to facilitate the comparison and control functions. In addition, the definition device 10 and the transformation device 20 are designed to interact to facilitate the transformation. In addition, the transformation device 20 and the comparison and control system 80 are designed to interact to facilitate the comparison and control functions.

In detail, the green area maintenance robot 60 comprises the robot position determining system 70, in particular at least partially or completely.

Furthermore, the green area maintenance robot 60 comprises the comparison and control system 80.

In addition, the green area maintenance robot 60 is designed as a lawnmower robot 61.

Furthermore, in the exemplary embodiments shown, the land area 100 is a field of grass.

In addition, in the exemplary embodiments shown the delimiting border 101 is defined by one end of the land area 100, in particular in the form of a path and a wall.

In addition, in the exemplary embodiments shown the first position determining technology PBT1 is satellite position determining GNSS, local position determining LPS, radio position determining FPB and/or odometry position determining OPB.

Figure 7:
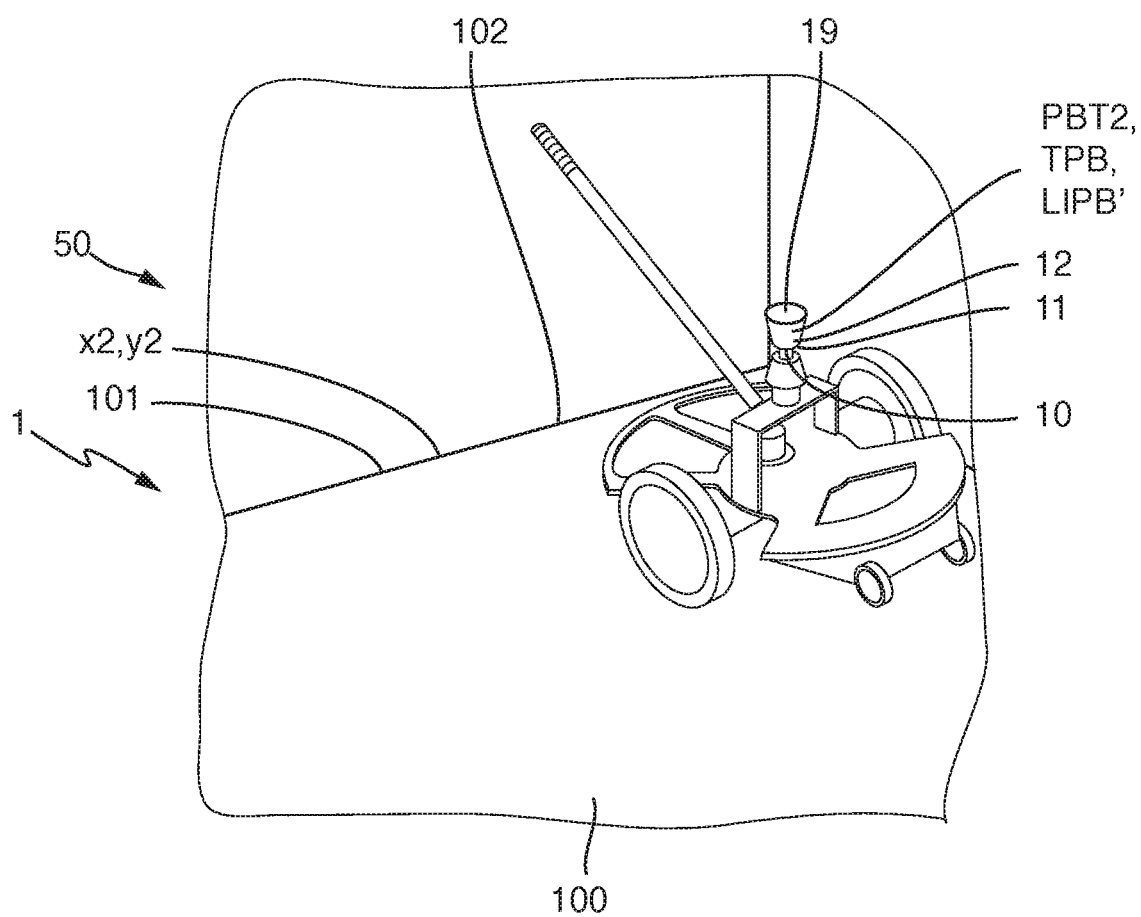
FIG. 7 shows another schematic view of the method and the teach-in system for teaching at least the section of the delimiting border of the land area for the green area maintenance system comprising the definition, in particular the detection of the sequence of teach-in position coordinates.

In alternative exemplary embodiments, the first position determining technology can be, in particular either, satellite position determining, local position determining, radio position determining, inertial position determining, odometry position determining, ultrasonic position determining UPB, as indicated in FIG. 7, sonographic position determining SGPB, as indicated in FIG. 7, sonar position determining SPB, as indicated in FIG. 7, radar position determining RPB, as indicated in FIG. 7, radargrammetric position determining RGPB as indicated in FIG. 7, tachymetric position determining, lidar position determining, laser-scanning position determining LAPB, as indicated in FIG. 7, camera position determining, image position determining and/or photogrammetric position determining, wherein the first position determining technology is different from the second position determining technology.

In detail, in the exemplary embodiments shown, the robot position determining system 70, in particular the green area maintenance robot 60, has a satellite-position determining receiver or GNSS receiver or radio receiver or FPB receiver 71 for receiving global signals, in particular global radio signals, from navigation satellites and pseudolites.

In addition, the green area maintenance system 50, in particular the robot position determining system 70, has a reference satellite-position determining receiver or reference GNSS receiver or reference radio receiver or reference FPB receiver 95 for receiving global signals, in particular global radio signals, from navigation satellites and pseudolites. The reference receiver 95 is installed at the section 102 of the delimiting border 101. The satellite-position determining receiver or GNSS receiver or radio receiver or FPB receiver 71 and the reference receiver 95 are designed to interact, in particular to be in signal connection with each other, in order to enable the position determining to be relatively accurate.

In addition, the green area maintenance system 50 comprises a docking station 90 for the green area maintenance robot 60. In the exemplary embodiments shown, the docking station 90 is installed at the section 102 of the delimiting border 101. In alternative exemplary embodiments, the docking station may be installed within the delimiting border or on the land area. In the exemplary embodiments shown, the docking station 90 is a charging station for charging the green area maintenance robot 60.

In detail, the docking station 90 comprises the reference receiver 95.

Thus, the green area maintenance robot 60 partially comprises the robot position determining system 70 based on satellite-position determining and/or radio-position determining, and in particular completely comprises the satellite-position determining receiver or GNSS receiver or radio receiver or FPB receiver 71.

In addition, in the exemplary embodiments shown, the robot position determining system 70, in particular the green area maintenance robot 60, has a local position determining receiver or LPS receiver or radio receiver or FPB receiver 75 for receiving local signals, in particular local radio signals, from at least one local position determining-station transmitter 99a, 99b, 99c, 99d, 99e, 99f, 99g, 99h, 99i, in the exemplary embodiments shown from nine local position determining-station transmitters 99a-i.

In addition, the green area maintenance system 50, in particular the robot position determining system 70, comprises the at least one local position determining station transmitter 99a-i for transmitting the local signals, in particular the local radio signals, and in the exemplary embodiments shown the nine local position determining station transmitters 99a-i. The at least one local position determining station transmitter 99a-i is installed at the section 102 of the delimiting border 101. The local position determining receiver or LPS receiver or radio receiver or FPB receiver 75 and the at least one local position determining-station transmitters 99a-i are designed to interact, in particular to be in signal connection with each other, in order to facilitate the position determination.

Specifically, the position determining station transmitters 99a-i are installed in corners of the land area 100. Thus, the position determining station transmitters 99a-i define an LPS (LPS: local position determining system).

Thus, the green area maintenance robot 60 partially comprises the robot position determining system 70 based on local position determining and/or radio position determining, and in particular completely comprises the local position determining receiver or LPS receiver or radio receiver or FPB receiver 75.

In addition, in the exemplary embodiments shown, the green area maintenance robot 60 has drive wheels 62.

Furthermore, in the exemplary embodiments shown, the robot position determining system 70, in particular the green area maintenance robot 60, has an odometry position determining device 79. The odometry position determining device 79 is designed to interact with the drive wheels 62, in particular to facilitate the position determining on the basis of a respective circumference and a respective rotation speed of the drive wheels 62.

Therefore, the green area maintenance robot 60 comprises the robot position determining system 70 based on odometry position determining, in particular completely.

In addition, in the exemplary embodiment shown in FIGS. 1 to 6 the second position determining technology PBT2 is inertial position determining IMU, camera position determining KPB, image position determining BPB and/or photogrammetric position determining PPB. In the exemplary embodiment shown in FIG. 7, the second position determining technology PBT2 is tachymetric position determining TPB and/or lidar position determining LIPB.

In alternative exemplary embodiments, the second position determining technology can be, in particular either, satellite position determining, local position determining, radio position determining, inertial position determining, odometry position determining, ultrasonic position determining UPB, as indicated in FIG. 7, sonographic position determining SGPB, as indicated in FIG. 7, sonar position determining SPB, as indicated in FIG. 7, radar position determining RPB, as indicated in FIG. 7, radargrammetric position determining as indicated in FIG. 7, tachymetric position determining, lidar position determining, laser-scanning position determining LAPB, as indicated in FIG. 7, camera position determining, image position determining and/or photogrammetric position determining, wherein the second position determining technology is different from the first position determining technology.

In addition, step a) comprises: detecting the sequence of teach-in position coordinates x2, y2 by means of a teach-in position determining system 11, in particular at least one part 12 of the teach-in position determining system 11, in particular the entire teach-in position determining system 11, at, in particular on, the section 102 and/or on the land area 100.

The definition device 10 comprises the teach-in-position determining system 11, in particular completely. The teach-in position determining system 11 is designed to detect the sequence of teach-in position coordinates x2, y2.

In the exemplary embodiment shown in FIGS. 1 to 6, the teach-in system 1 has a portable, and in particular user-operable, teach-in device 13, in particular in the form of a smartphone. The teach-in device 13 comprises the definition device 10, in particular and the transformation device 20, in particular completely.

The teach-in device 13 or the teach-in position determining system 11 has at least one acceleration and/or rotation rate sensor 14 for measuring accelerations and/or rotation rates of the teach-in device 13 or the teach-in position determining system 11, and for integrating the measured accelerations and/or the measured rotation rates. In addition, the teach-in device 13 or the teach-in position determining system 11 has a camera 15, in particular in the form of a digital camera, for taking photographs BI of the section 102 of the delimiting border 101, in particular from different positions P11, P13. In addition, the teach-in device 13 or the teach-in-position determining system 11 has an image-based and/or photogrammetric position determining device 16 for evaluating the images BI recorded with the camera 15 to facilitate the position determining.

Specifically, detecting the sequence of teach-in-position coordinates x2, y2 comprises recording the images BI of the section 102 of the delimiting border 101, in particular from different positions P11, P13.

In particular, the recorded images BI, in particular in each case, are output, in particular displayed, on an output device 17, in particular on a display, in particular in the form of a touch screen of the teach-in device 13 or the teach-in position determining system 11.

In addition, detecting the sequence of teach-in-position coordinates x2, y2 comprises referencing, in particular with a marker symbol MS, at least one pixel in a respective image BI of the recorded images BI as a delimiting border pixel.

In particular, the referencing is performed automatically, in particular by means of image recognition, and/or by the user, in particular by means of an input device 18, in particular in the form of the touch screen, the teach-in device 13 or the teach-in position determining system 11.

Furthermore, detecting the sequence of teach-in-position coordinates x2, y2 comprises determining the sequence of teach-in-position coordinates x2, y2 based on the delimiting border pixels, in particular by means of photogrammetry.

In particular, the different positions P11, P13 are reached by a translational movement of the teach-in device 13 or the teach-in position determining system 11, in particular the camera 15, in particular by the user walking around the land area 100.

In addition, the translational movement of the teach-in device 13 or the teach-in position determining system 11, in particular the camera 15, is detected by means of the at least one acceleration and/or rotation rate sensor 14. The detected translational motion is included in the determination of the sequence of teach-in position coordinates x2, y2 based on the delimiting border pixels. This process can be referred to as optical flow.

In particular, the at least one acceleration and/or rotation rate sensor 14, the camera 15 and the image-based and/or photogrammetric position determining device 16 are designed to interact to facilitate the position determination.

In the exemplary embodiment shown in FIG. 7, the part 12 has a reflector 19 for reflecting light from a tachymeter and/or Lidar-position determining transceiver of the teach-in position determining system 11, in particular at the section 102 and/or on the land area 100.

In particular, the part 12, in particular the reflector 19, and the tachymeter and/or lidar position determining transceiver are designed to interact to facilitate the position determination.

In detail, step a) comprises: guiding the at least one part 12, in particular the reflector 19, of the teach-in position determining system 11 along at least the section 12, in particular by the user, and detecting, in particular the, teach-in position coordinates of the at least one part 12, in particular the reflector 19, during the guidance.

In the exemplary embodiment shown in FIG. 7, the part 12 is a portable, in particular ground-guided, hand-held device, in particular with the same dimensions as the green area maintenance robot 60.

In particular, the reflector 19 is arranged centrally and/or point-symmetrically on the part 12. In addition, the part 12 has a cardan joint, in particular to allow it to slide like a vacuum cleaner. In addition, an inner radius corresponds to a width of a lawn-mowing tool of the green area maintenance robot 60, in particular to allow teaching-in of level transitions. In addition, an outer radius corresponds to a width of the green area maintenance robot 60, in particular to allow teaching-in of fixed obstacles.

Figure 3:
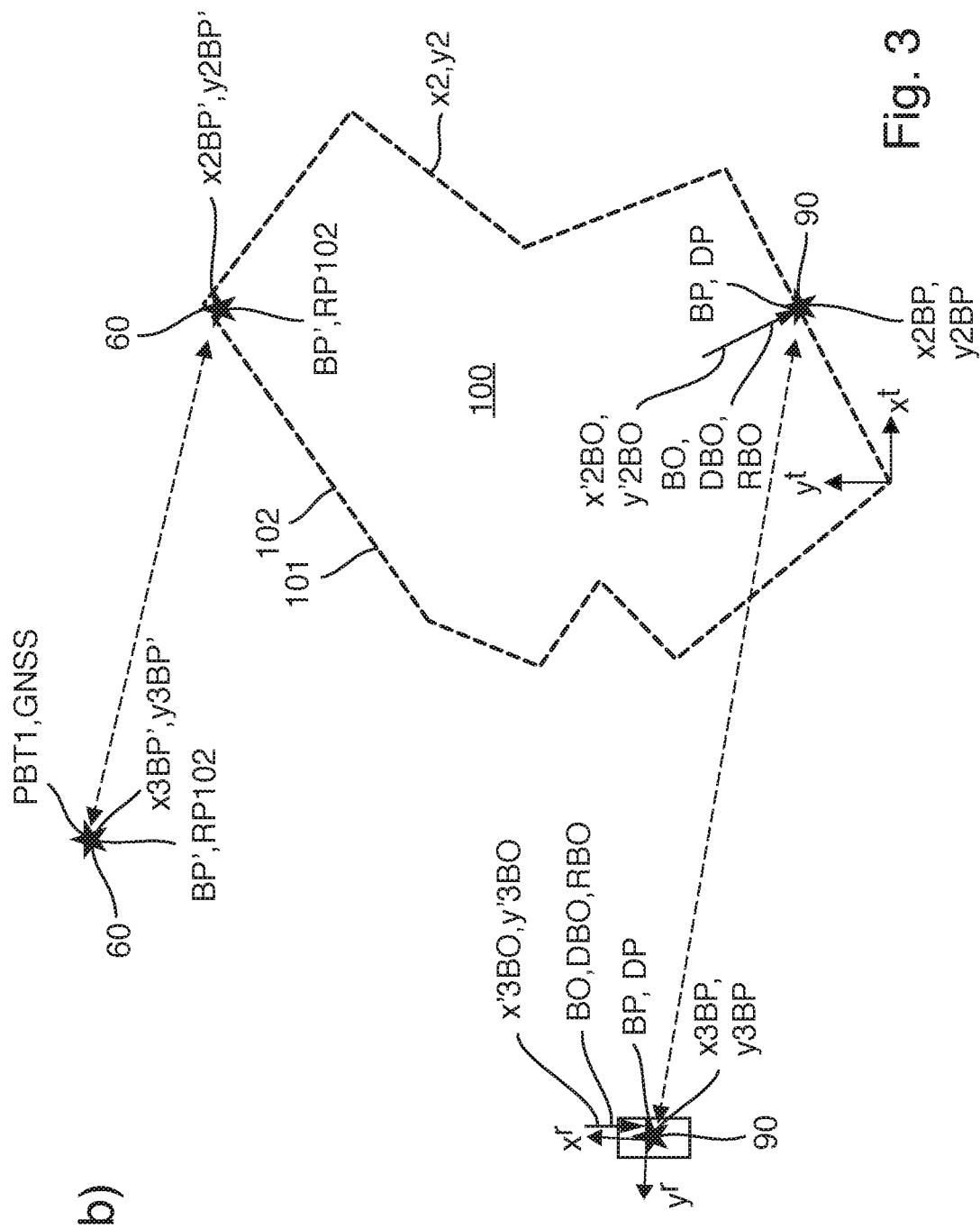
FIG. 3 shows another schematic view of the method of FIG. 1 comprising a transformation, in particular comprising a translation, of the defined sequence of teach-in position coordinates into a sequence of transformation robot position coordinates, in particular comprising a translation.
Figure 4:
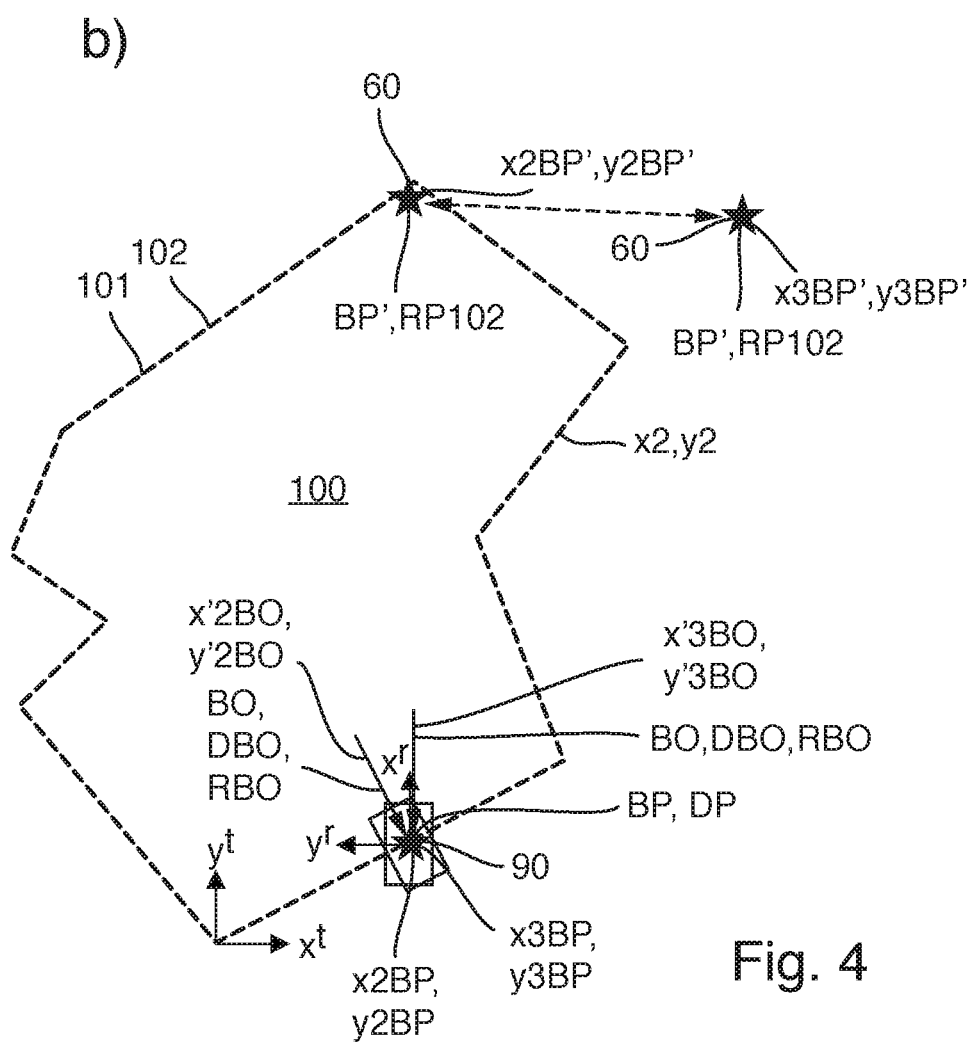
FIG. 4 shows another schematic view of the transformation, in particular comprising a rotation.
Figure 5:
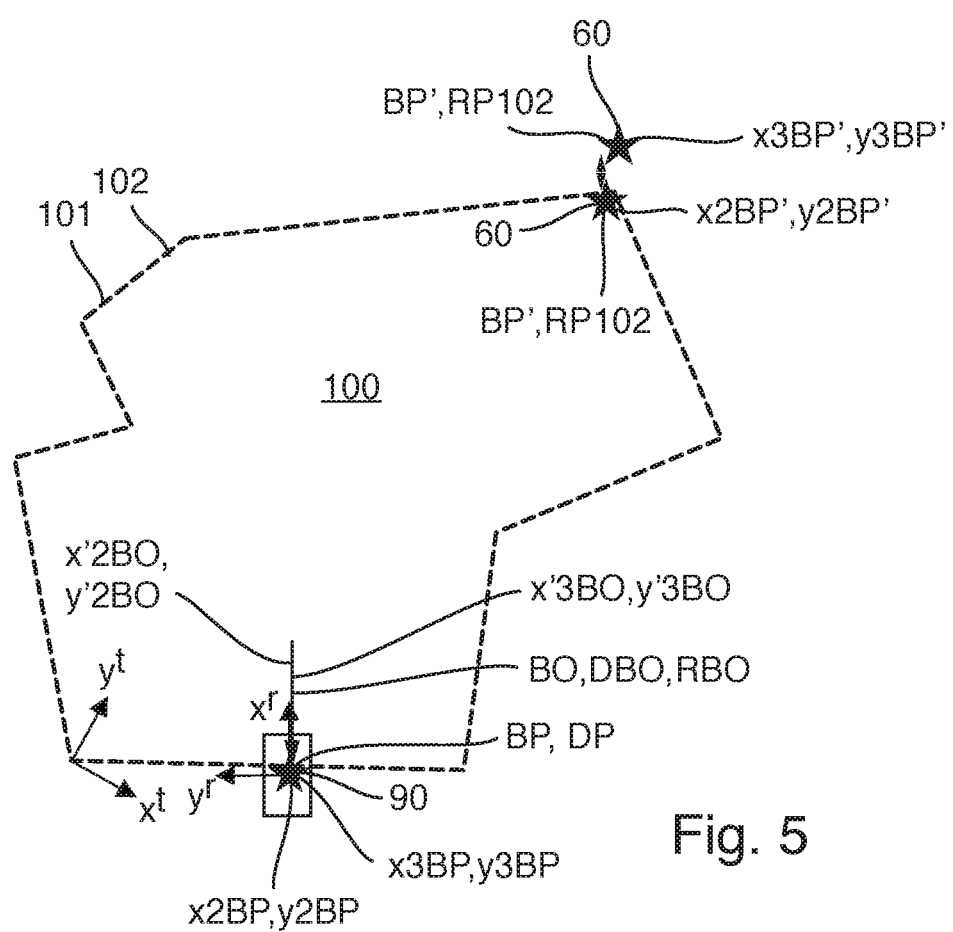
FIG. 5 shows another schematic view of the transformation, in particular comprising a scaling.
Figure 6:
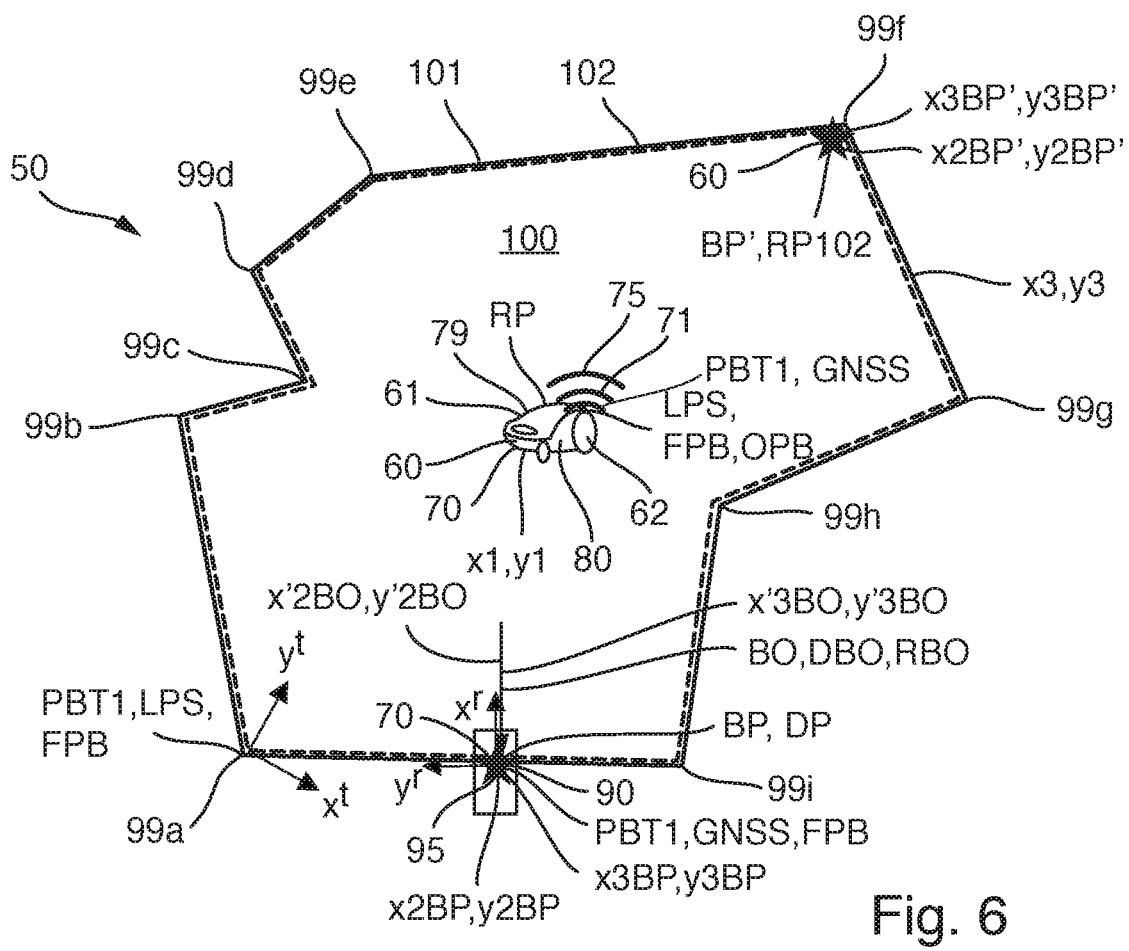
FIG. 6 shows a schematic view of the sequence of transformation robot position coordinates, a method for operating the green area maintenance system, and the green area maintenance system according to an embodiment of the invention.

In addition, step b) comprises: translation, in particular as shown in FIG. 3, rotation, in particular as shown in FIG. 4, and/or scaling, in particular as shown in FIG. 5 and/or if necessary.

In detail, the defined sequence of teach-in position coordinates x2, y2 is displaced. In addition, the displaced sequence of teach-in-position coordinates x2, y2 is rotated. In addition, the displaced and rotated sequence of teach-in position coordinates x2, y2 is scaled, in particular if necessary.

In addition, the method comprises the step of: identifying reference-point teach-in position coordinates x2BP, y2BP with respect to, in the exemplary embodiments shown, the sequence of teach-in position coordinates x2, y2. In addition, the method comprises the step of: identifying reference-point transformation robot position coordinates x3BP, y3BP with respect to the sequence of transformation robot position coordinates x3, y3. Step b) comprises: transforming subject to the condition that the identified reference-point teach-in position coordinates x2BP, y2BP and the identified reference-point transformation robot position coordinates x3BP, y3BP identify the same reference point BP.

The teach-in system 1 comprises an identification device 30. The identification device 30 is designed to identify the reference-point teach-in position coordinates x2BP, y2BP with respect to the sequence of teach-in position coordinates x2, y2, and to identify the reference-point transformation robot position coordinates x3BP, y3BP with respect to the sequence of transformation robot position coordinates x3, y3. The transformation device 20 is designed for transforming subject to the condition that the identified reference-point teach-in position coordinates x2BP, y2BP and the identified reference-point transformation robot position coordinates x3BP, y3BP identify the same reference point BP.

In addition, the method comprises the step of: identifying additional reference-point teach-in position coordinates x2BP', y2BP' with respect to the sequence of the teach-in position coordinates x2, y2 shown in the exemplary embodiments, in particular using the identification device 30. In addition, the method comprises the step of: identifying additional reference-point transformation robot position coordinates x3BP', y3BP' with respect to the sequence of transformation robot position coordinates x3, y3, in particular using the identification device 30. Step b) comprises: transforming subject to the condition that the identified additional reference-point teach-in position coordinates x2BP', y2BP' and the identified additional reference-point transformation robot position coordinates x3BP', y3BP' identify the same additional reference point BP', in particular using the transformation device 20.

In addition, the method comprises the step of: identifying a teach-in orientation x'2BO, y'2BO at the, in particular identified, reference-point teach-in position coordinates x2BP, y2BP with respect to the sequence of teach-in position coordinates x2, y2, in particular using the identification device 30. In addition, the method comprises the step of: identifying a transformation robot orientation x'3BO, y'3BO at the, in particular identified, reference-point transformation robot position coordinates x3BP, y3BP with respect to the sequence of transformation robot position coordinates x3, y3, in particular using the identification device 30. Step b) comprises: transforming subject to the condition that the identified teach-in orientation x'2BO, y'2BO and the identified transformation robot orientation x'3BO, y'3BO identify the same reference orientation BO at the reference point BP, in particular using the transformation device 20.

In alternative exemplary embodiments, the transformation can be performed subject to the condition of either the same additional reference point or the same reference orientation.

In the exemplary embodiments shown, the reference point BP is identified by a docking station position DP of the docking station 90 for the green area maintenance robot 60.

The additional reference point BP' is identified by a robot position RP102 of the green area maintenance robot 60 which is, in particular, different from the docking-station position DP, in the exemplary embodiments shown at the section 102. In alternative exemplary embodiments, the additional reference point can be identified by a robot position of the green area maintenance robot within the delimiting border or on the land area.

In detail, the robot position RP102 for the additional reference point BP', which is in particular different from the docking station position DP, is reached by moving the green area maintenance robot 60, in particular controlled by the user.

The reference orientation BO is identified by a docking-station orientation DBO of the docking station 90 and/or by a robot orientation RBO of the green area maintenance robot 60, in the exemplary embodiments shown at the section 102, in particular if the green area maintenance robot 60 is docked onto the docking station 90. In alternative exemplary embodiments, the reference orientation can be identified by a docking-station orientation of the docking station and/or by a robot orientation of the green area maintenance robot within the delimiting border or on the land area.

In detail, the docking station 90 is positioned with the docking-station orientation DBO at the section 102 and orthogonal to the latter. The green area maintenance robot 60 is positioned with the robot orientation RBO at the section 102, orthogonal to the latter, particularly if the green area maintenance robot 60 is docked onto the docking station 90. In alternative exemplary embodiments, the docking station may be positioned with the docking station orientation at the section or within the delimiting border or on the land area, orthogonal or parallel or inclined to the latter. In addition or alternatively, in alternative exemplary embodiments, the green area maintenance robot may be positioned with the robot orientation at the section or within the delimiting border or on the land area, orthogonal or parallel or inclined to the latter.

In the exemplary embodiment shown in FIGS. 1 to 6, the teach-in device 13 comprises the identification device 30, in particular completely.

In particular, the reference-point teach-in position coordinates x2BP, y2BP, the reference-point transformation robot position coordinates x3BP, y3BP, the additional reference-point teach-in position coordinates x2BP', y2BP', the additional reference-point transformation robot position coordinates x3BP', y3BP', the teach-in orientation x'2BO, y'2BO, and/or the transformation robot orientation x'3BO/y'3BO are identified automatically, in particular using image recognition, and/or by the user, in particular by means of the input device 18, in particular in the form of the touch screen, of the teach-in device 13.

The identification device 30, the teach-in position determining system 11 and the robot position determining system 70 are designed to interact to enable the identification. In addition, the identification device and the transformation device 20 are designed to interact to facilitate the transformation.

As the exemplary embodiments shown and explained above make clear, the invention provides an advantageous method and an advantageous teach-in system for teaching at least one section of a delimiting border of a land area for a green area maintenance system, each of which has improved properties. Furthermore, the invention provides an advantageous method for operating a green area maintenance system having such a teach-in method, and an advantageous green area maintenance system having such a teach-in system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for teaching at least one section of a delimiting border of a land area for a green area maintenance system, wherein the green area maintenance system comprises:
    an autonomous mobile green area maintenance robot, and
    a robot position determining system, wherein the robot position determining system is designed to detect robot position coordinates of the green area maintenance robot, wherein the robot position coordinates are based on a first position determining technology,
   wherein the method comprises the steps of:
   (a) defining a sequence of teach-in position coordinates of the section, the teach-in position coordinates being based on a second position determining technology different from the first position determining technology, and
   (b) transforming the defined sequence of teach-in position coordinates into a sequence of transformation robot position coordinates, the transformation robot position coordinates being based on the first position determining technology.

2. The method according to claim 1, wherein
the first position determining technology or the second position determining technology is one or more of: satellite-based position determining, local position determining, radio position determining, inertial position determining, odometry position determining, ultrasonic position determining, sonographic position determining, sonar position determining, radar position determining, radargrammetric position determining, tachymeter position determining, lidar position determining, laser-scanning position determining, camera position determining, image-based position determining and photogrammetric position determining.

3. The method according to claim 1, wherein step a) comprises:
detecting the sequence of teach-in position coordinates via at least one part of the teach-in position determining system, at the section and/or on the land area.

4. The method according to claim 3, wherein step a) comprises:
guiding the at least one part of the teach-in position determining system along at least the section, and
detecting teach-in position coordinates of the at least one part during the guiding.

5. The method according to claim 1, wherein step b) comprises: translation, rotation, and/or scaling.

6. The method according to claim 1, further comprising:
identifying reference-point teach-in position coordinates with respect to the sequence of teach-in position coordinates,
identifying reference-point transformation robot position coordinates with respect to the sequence of transformation robot position coordinates, and
wherein step b) comprises: transforming subject to the condition that the identified reference-point teach-in position coordinates and the identified reference-point transformation robot position coordinates identify the same reference point.

7. The method according to claim 6, further comprising one or both of:
(i) identifying additional reference-point teach-in position coordinates with respect to the sequence of teach-in position coordinates; identifying additional reference-point transformation robot position coordinates with respect to the sequence of transformation robot position coordinates; and wherein step b) comprises: transforming subject to the condition that the identified additional reference-point teach-in position coordinates and the identified additional reference-point transformation robot position coordinates identify the same additional reference point, and
(ii) identifying a teach-in orientation at the reference-point teach-in position coordinates with respect to the sequence of teach-in position coordinates; identifying a transformation robot orientation at the reference-point transformation robot position coordinates with respect to the sequence of transformation robot position coordinates; and wherein step b) comprises: transforming subject to the condition that the identified teach-in orientation and the identified transformation robot orientation identify the same reference orientation at the reference point.

8. The method according to claim 7,
wherein the additional reference point is characterized by a docking station position of a docking station for the green area maintenance robot and/or by a robot position different from the docking station position of the green area maintenance robot, and
wherein the reference orientation is characterized by a docking station orientation of the docking station and/or by a robot orientation of the green area maintenance robot.

9. A method for operating a green area maintenance system, wherein the green area maintenance system comprises:
an autonomous mobile green area maintenance robot,
a robot position determining system, wherein the robot position determining system is designed to detect robot position coordinates of the green area maintenance robot, wherein the robot position coordinates are based on a first position determining technology, and
a comparison and control system, wherein the comparison and control system is designed to compare the detected robot position coordinates with a sequence of transformation robot position coordinates and to control a movement of the green area maintenance robot depending on a result of the comparison, the transformation robot position coordinates being based on the first position determining technology,
wherein the method comprises the steps of:
teaching at least one section of a delimiting border of a land area for the green area maintenance system by:
defining a sequence of teach-in position coordinates of the section, the teach-in position coordinates being based on a second position determining technology different from the first position determining technology, and
transforming the defined sequence of teach-in position coordinates into a sequence of transformation robot position coordinates, the transformation robot position coordinates being based on the first position determining technology, and
wherein the method further comprises the steps of:
detecting robot position coordinates of the green area maintenance robot via the robot position determining system;
comparing the detected robot position coordinates with the sequence of transformation robot position coordinates using the comparison and control system; and
controlling movement of the green area maintenance robot depending on the result of the comparison using the comparison and control system.

10. The method according to claim 9,
wherein the green area maintenance robot comprises the robot position determining system.

11. The method according to claim 9,
wherein the green area maintenance robot is a lawnmower robot.

12. A teach-in system for teaching at least one section of a delimiting border of a land area for a green area maintenance system, wherein the green area maintenance system comprises:
an autonomous mobile green area maintenance robot, and
a robot position determining system, wherein the robot position determining system is designed to detect robot position coordinates of the green area maintenance robot, wherein the robot position coordinates are based on a first position determining technology,
wherein the teach-in system comprises:
a definition device, wherein the definition device is designed to define a sequence of teach-in position coordinates of the section, the teach-in position coordinates being based on a second position determining technology different from the first position determining technology, and a transformation device, wherein the transformation device is designed to transform the defined sequence of teach-in position coordinates into a sequence of transformation robot position coordinates, the transformation robot position coordinates being based on the first position determining technology.

13. The teach-in system according to claim 12, wherein the definition device comprises:

a teach-in position determining system, wherein the teach-in position determining system is designed to detect the sequence of teach-in position coordinates.

14. The teach-in system according to claim 13, further comprising:

an identification device, wherein the identification device is designed to identify reference-point teach-in position coordinates with respect to the sequence of teach-in position coordinates and to identify reference-point transformation robot position coordinates with respect to the sequence of transformation robot position coordinates, and the transformation device is designed for transforming subject to the condition that the identified reference-point teach-in position coordinates and the identified reference-point transformation robot position coordinates identify the same reference point.

15. A green area maintenance system, comprising:

a teach-in system, wherein the teach-in system comprises:

a definition device, wherein the definition device is designed to define a sequence of teach-in position coordinates of a section, the teach-in position coordinates being based on a second position determining technology different from a first position determining technology, and a transformation device, wherein the transformation device is designed to transform the defined sequence of teach-in position coordinates into a sequence of transformation robot position coordinates, the transformation robot position coordinates being based on the first position determining technology;

an autonomous mobile green area maintenance robot, a robot position determining system, wherein the robot position determining system is designed to detect robot position coordinates of the green area maintenance robot, wherein the robot position coordinates are based on the first position determining technology, and a comparison and control system, wherein the comparison and control system is designed to compare the detected robot position coordinates with a sequence of transformation robot position coordinates and to control a movement of the green area maintenance robot depending on a result of the comparison, the transformation robot position coordinates being based on the first position determining technology.

* * * * *